(12) United States Patent
Bond et al.

(10) Patent No.: US 6,675,483 B2
(45) Date of Patent: Jan. 13, 2004

(54) COMBINATION BARBECUE TOOL

(75) Inventors: Gregg Bond, Los Angeles, CA (US); Barry Helman, Malibu, CA (US); Andrew Helman, Ventura, CA (US)

(73) Assignee: Helman Group, Ltd., Oxnard, CA (US)

( * ) Notice: Subject to any disclaimer, the term of this patent is extended or adjusted under 35 U.S.C. 154(b) by 54 days.

(21) Appl. No.: 10/020,651

(22) Filed: Nov. 29, 2001

(65) Prior Publication Data

US 2003/0097759 A1 May 29, 2003

(51) Int. Cl.⁷ .............................................. B25B 23/18
(52) U.S. Cl. ............................ 30/142; 30/324; 30/322; 30/340; 362/120
(58) Field of Search ........................ 30/322, 324, 340, 30/142; 362/119, 120, 109, 253; 16/406; 7/110, 112, 113

(56) References Cited

U.S. PATENT DOCUMENTS

| | | |
|---|---|---|
| 4,207,673 A | 6/1980 | DiGirolamo et al. |
| 4,914,819 A | 4/1990 | Ash |
| 5,075,970 A | 12/1991 | Albert |
| 5,189,793 A | 3/1993 | Ratzon et al. |
| 5,421,089 A | 6/1995 | Dubus et al. |
| 5,964,517 A * | 10/1999 | Adams ........................ 362/119 |
| 6,336,731 B1 * | 1/2002 | Chien ......................... 362/120 |

* cited by examiner

*Primary Examiner*—Douglas D. Watts
(74) *Attorney, Agent, or Firm*—Marvin E. Jacobs

(57) ABSTRACT

A simple, effective, lightweight, durable, combination tool having removably attachable interchangeable implements, which are interchangeable one with the other. The combination tool has locking means, which releasably locks the removably attachable interchangeable implements into a handle. The handle can have a light for illuminating an area or work surface, and the food being cooked and/or barbecued. The handle can have a timer capable of being set to at least one time duration, and audibly alerting a user at the end of a selected one of such time durations, as to how long the food has been cooked or barbecued.

38 Claims, 6 Drawing Sheets

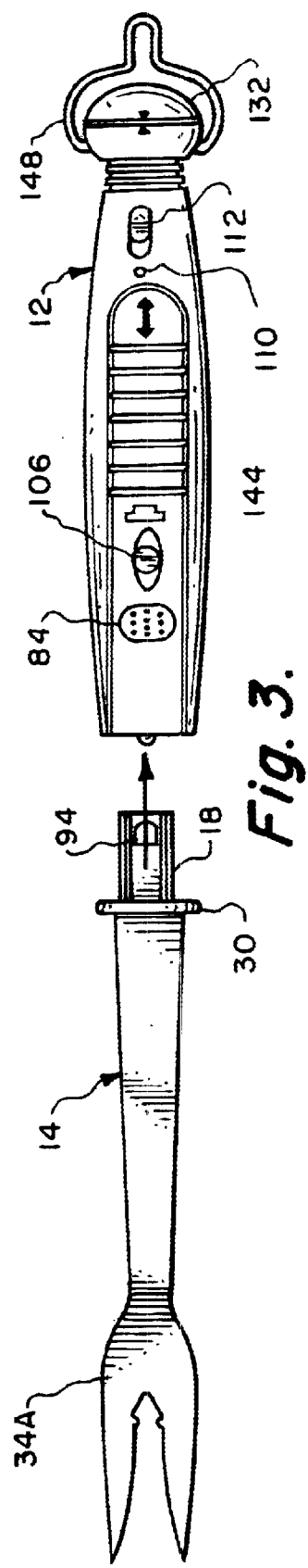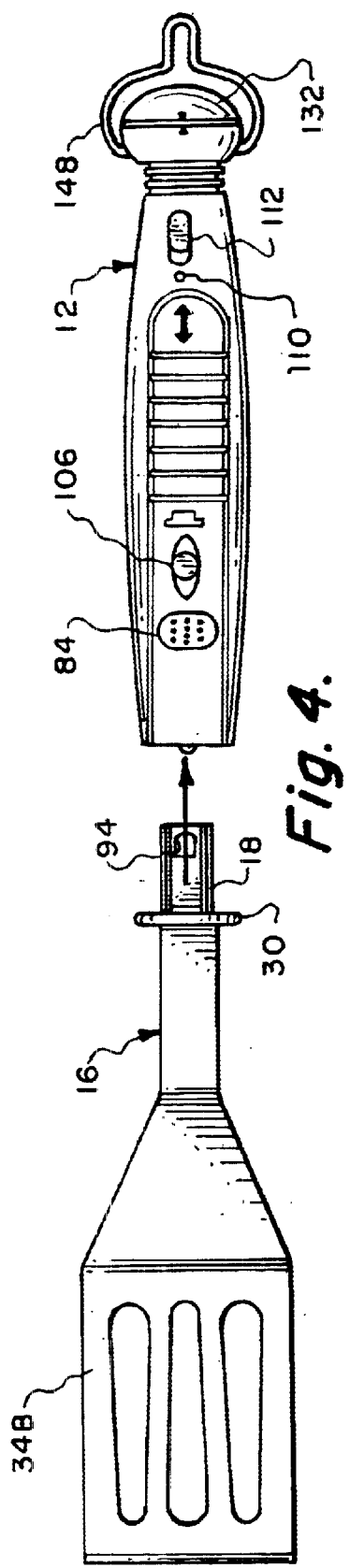
Fig. 3.
Fig. 4.

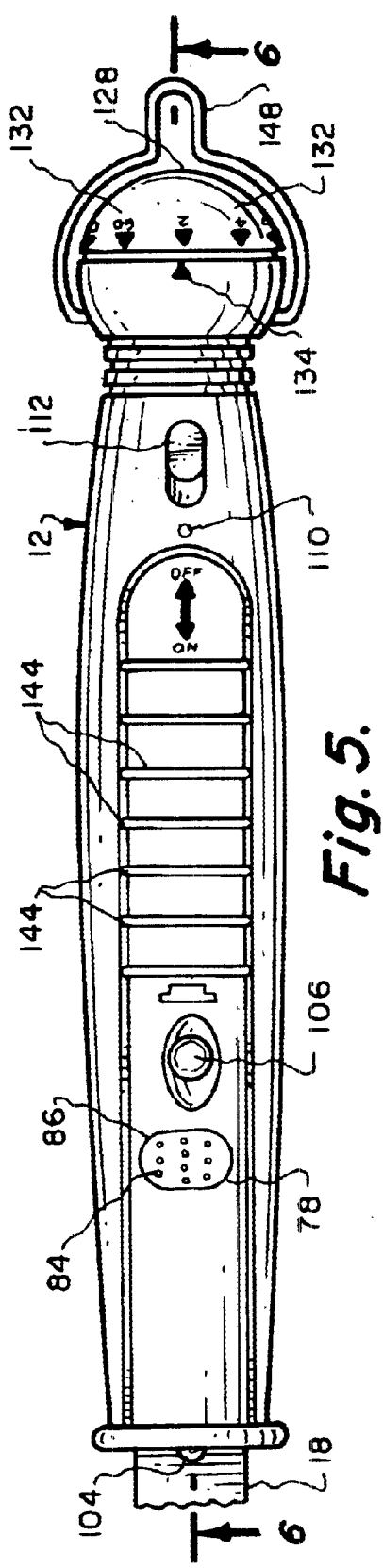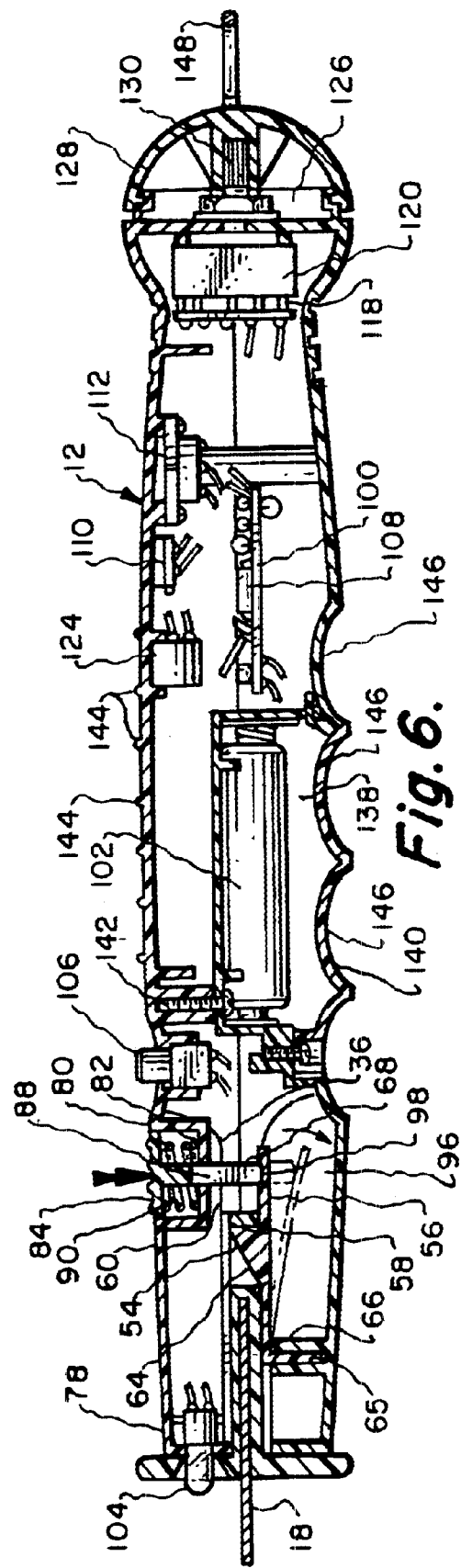

COMBINATION BARBECUE TOOL

BACKGROUND OF THE INVENTION

1. Techinical Field

The present invention relates generally to tools and more particularly to barbecue tools having removably attachable interchangeable implements.

2. Background of the Invention

Tools date back thousands of years, as man has sought to devise means for improving his existence, perform tasks, in certain instances otherwise not possible, and increase the efficiency of performing those tasks. Hand tools are often of unitary construction, and as technology has advanced, such tools have features not available heretofore, often making the tools expensive, and difficult to use in similar but different operations.

There is a need for a simple, effective, lightweight, durable, combination tool having removably attachable interchangeable implements, which requires minimal assembly. One of the most basic needs for such a combination tool is a tool which may be used with at least one removably attachable interchangeable implement to facilitate cooking and/or barbecuing. The functionality of the tool, however, should extend and be adaptable to all types of tools for different uses and purposes. The combination tool should be inexpensive, attractive, quick, and easy to install and remove implements therefrom, the implements being removably attachable therefrom and interchangeable one with the other, and the combination tool being compactly storable.

The combination tool should have positive locking means, which releasably locks the removably attachable interchangeable implements thereinto a handle. The handle should be capable of illuminating an area or work surface, and in the case of the combination tool directed to facilitating cooking or barbecuing, the handle should be capable of illuminating the food being cooked and/or barbecued. The handle should have a timer capable of being set to at least one time duration, and audibly alerting a user at the end of a selected one of such time durations, for example, as to how long the food has been cooked or barbecued. The handle should have a non slip, easy to grip surface, adapted to facilitate use during greasy and slippery conditions. The combination tool should be inexpensive, the handle being the most technologically complex and most expensive component of the combination tool, making it functionally advantageous and cost effective to have a plurality of removably attachable interchangeable implements adapted for use individually and one at a time with the handle.

STATEMENT OF PRIOR ART

Different tools, utensils, and cutlery have heretofore been known. However, none of the tools, cutlery or utensils adequately satisfies these aforementioned needs.

U.S. Pat. No. 4,207,673 (DiGirolamo et al) discloses an implement for assisting a user in modifying the user's eating habits, comprising an instrument such as a fork, knife, or spoon detachably attached to a hollow handle. The handle has a top side having window openings, which have diodes of two different colors visible at the window openings, and circuitry, including a battery and an on/off switch, for causing the diodes to be alternately turned on and off at predetermined intervals.

U.S. Pat. No. 5,421,089 (Dubus et al) discloses a fork with timer. The fork has a head and a plurality of spaced tines extended from the head, a handle extended from the head remote from the tines; timer circuitry connected to the handle adapted to provide a cue after an elapsed period of time, which may be used to indicate to a user that another bite of food may be taken using the fork; a replaceable power source connected to the fork coupled to the timer circuitry, the power source adapted to energize the timer circuitry; and a switch connected to the fork, the switch coupled between the power source and the timer circuitry, for energizing and de-energizing the timer circuitry.

U.S. Pat. No. 5,075,970 (Albert) discloses a utensil, which incorporates speech synthesis microelectronics. A switch on the exterior of the utensil handle actuates circuitry inside the utensil handle, including a speech synthesizer semiconductor chip and an amplifier semiconductor chip. Emulated speech generated by the speech synthesizer semiconductor chip is processed by the amplifier semiconductor chip and emitted from a loudspeaker in the utensil.

U.S. Pat. No. 5,189,793 (Ratzon et al) discloses a cutlery piece having a food holding portion, a handle, and an electronic device capable of generating light or sound. The electronic device has a light sensor in the food holding portion, which upon receipt of an electric input from the light sensor, after a period of darkness, the electronic device generates a transient light or sound signal.

U.S. Pat. No. 4,914,819 (Ash) discloses a dietary control eating utensil for indicating when food may be eaten therewith. The utensil has a handle having an elongated transparent material chamber for containing immiscible fluids having different densities, such as air and mineral oil. The lighter density fluid forms a bubble within the chamber, which may be used as a visible signal to a user to indicate when to consume food with the utensil.

For the foregoing reasons, there is a need for a simple, effective, lightweight, durable, combination tool having removably attachable interchangeable implements, which requires minimal assembly. The combination tool should be capable of being used with at least one removably attachable implement to facilitate cooking and/or barbecuing. The functionality of the tool, however, should extend and be adaptable to all types of tools for different uses and purposes. The combination tool should be inexpensive, attractive, quick, and easy to install and remove implements therefrom, the implements being removably attachable therefrom and interchangeable one with the other, the combination tool being compactly storable, and having positive locking means, which releasably locks the removably attachable interchangeable implements thereinto a handle. Optionally, the handle can be capable of illuminating an area or work surface, and in the case of the combination tool directed to facilitating cooking or barbecuing, the handle can be capable of illuminating the food being cooked and/or barbecued. The handle can have a timer capable of being set to at least one time duration, and audibly alerting a user at the end of a selected one of such time durations, for example, as to how long the food has been cooked or barbecued. The handle preferably has a non slip, easy to grip surface, adapted to facilitate use during greasy and slippery conditions. The combination tool should be inexpensive, the handle being the most technologically complex and most expensive component of the combination tool, making it functionally advantageous and cost effective to have a plurality of removably attachable interchangeable implements adapted for use individually and one at a time with the handle.

STATEMENT OF THE INVENTION

The present invention is directed to a simple, effective, lightweight, durable, combination tool having removably attachable interchangeable implements, which requires minimal assembly. The combination tool is capable of being used with at least one removably attachable implement to facilitate cooking and/or barbecuing. The functionality of the tool is extendable and adaptable to all types of tools for different uses and purposes. The combination tool is inexpensive, attractive, quick, and easy to install and remove implements therefrom, the implements being removably attachable therefrom and interchangeable one with the other, the combination tool being compactly storable, and having positive locking means, which releasably locks the removably attachable interchangeable implements thereinto a handle. The handle is capable of illuminating an area or work surface, and in the case of the combination tool directed to facilitating cooking or barbecuing, the handle is capable of illuminating the food being cooked and/or barbecued. The handle has a timer capable of being set to at least one time duration, and audibly alerting a user at the end of a selected one of such time durations, for example, as to how long the food has been cooked or barbecued. The handle has a non slip, easy to grip surface, adapted to facilitate use during greasy and slippery conditions.

A combination tool having features of the present invention comprises: a handle, and at least one removably attachable implement adapted for use with the handle, the handle having an implement receiving portion and a spring loaded detent adapted to releasably lock the removably attachable implement thereinto the implement receiving portion of the handle.

These and other features, aspects, and advantages of the present invention will become better understood with regard to the following description, appended claims, and accompanying drawings where:

BRIEF DESCRIPTION OF THE DRAWINGS

FIG. 3 is a top view of the combination tool showing the fork implement removably attached to the handle of the combination tool;

FIG. 4 is a top view of the combination tool showing the spatula implement removably attached to the handle of the combination tool;

FIG. 5 is a top view of the handle of the combination tool;

FIG. 6 is a section view of the handle of the combination tool;

DETAILED DESCRIPTION OF THE INVENTION

Figure 1:
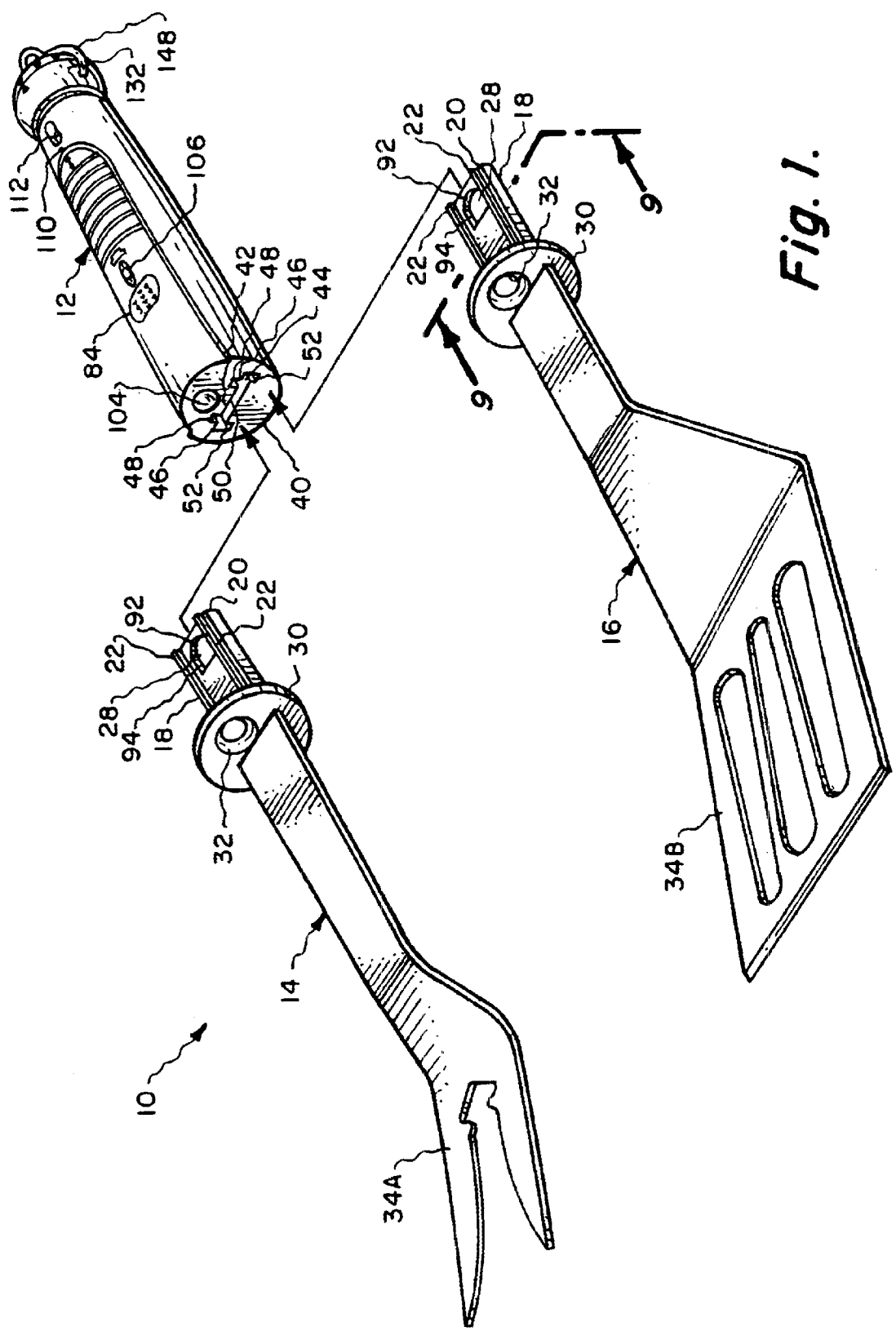
FIG. 1 is a perspective view of a combination tool having removably attachable interchangeable implements, constructed in accordance with the present invention.
Figure 2:
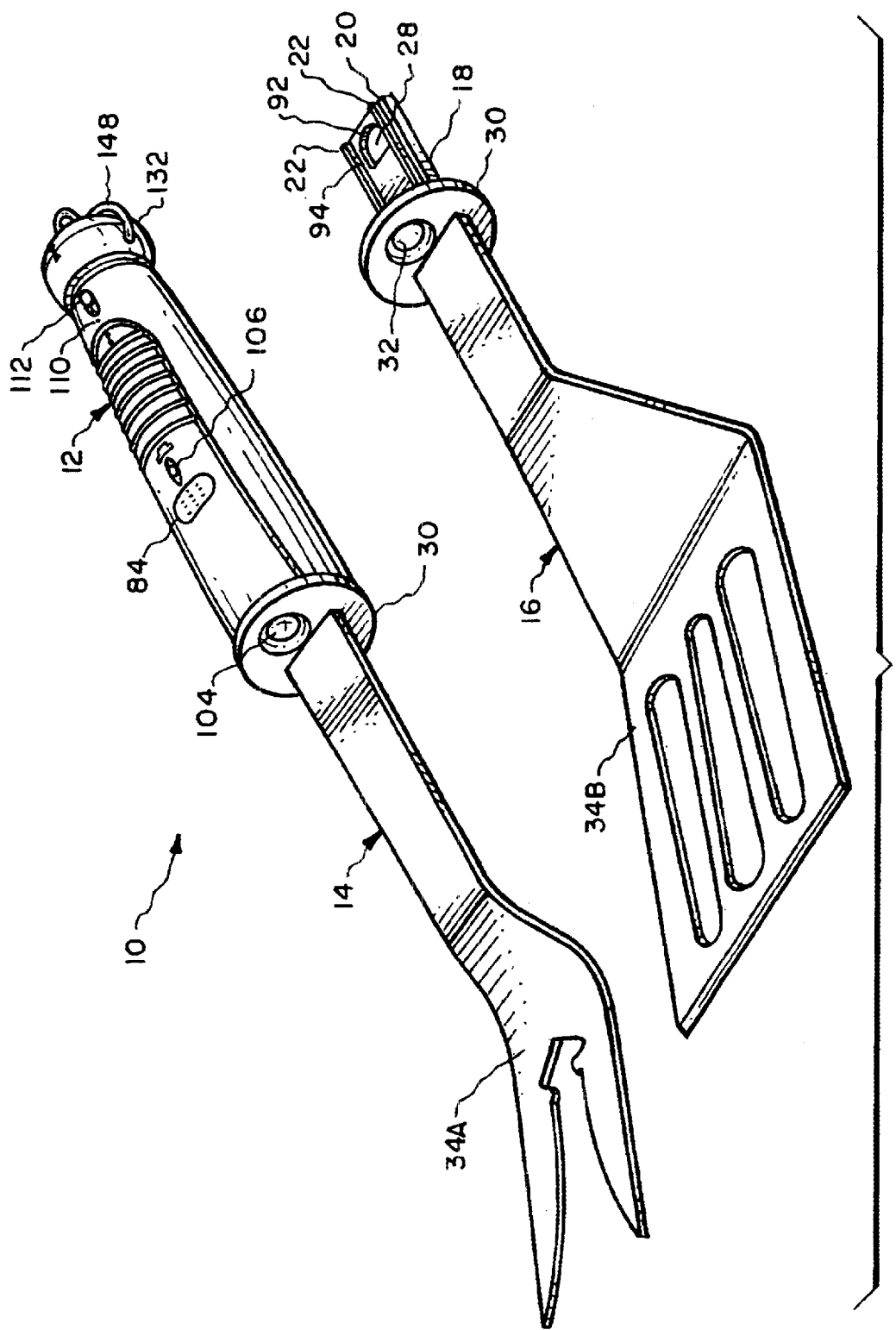
FIG. 2 is a perspective view of the combination tool showing a fork implement removably attached to a handle of the combination tool, and an adjacent spatula implement.
Figure 7:
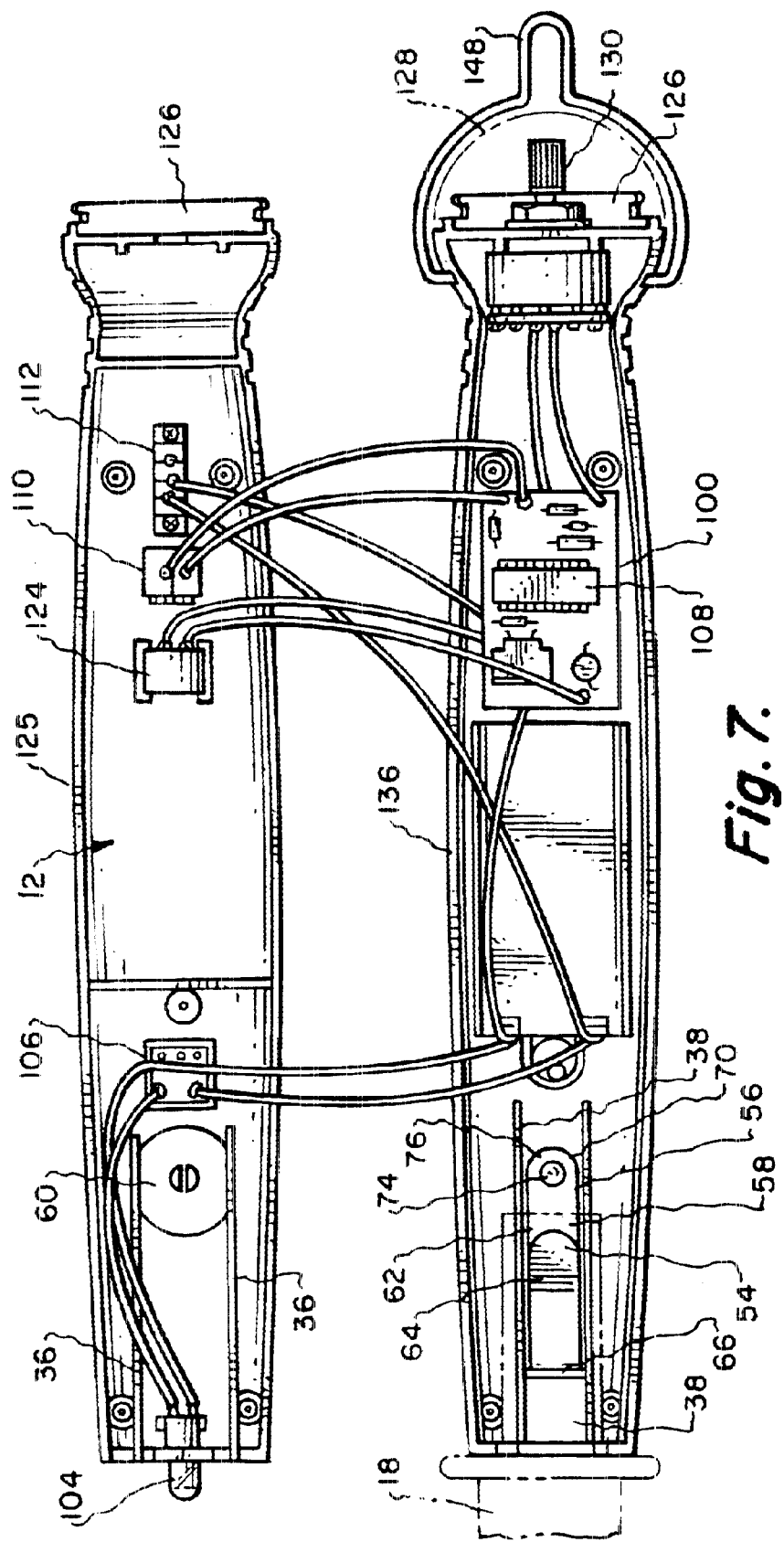
FIG. 7 is an interior view top and bottom portions of the handle of the combination tool.
Figure 8:
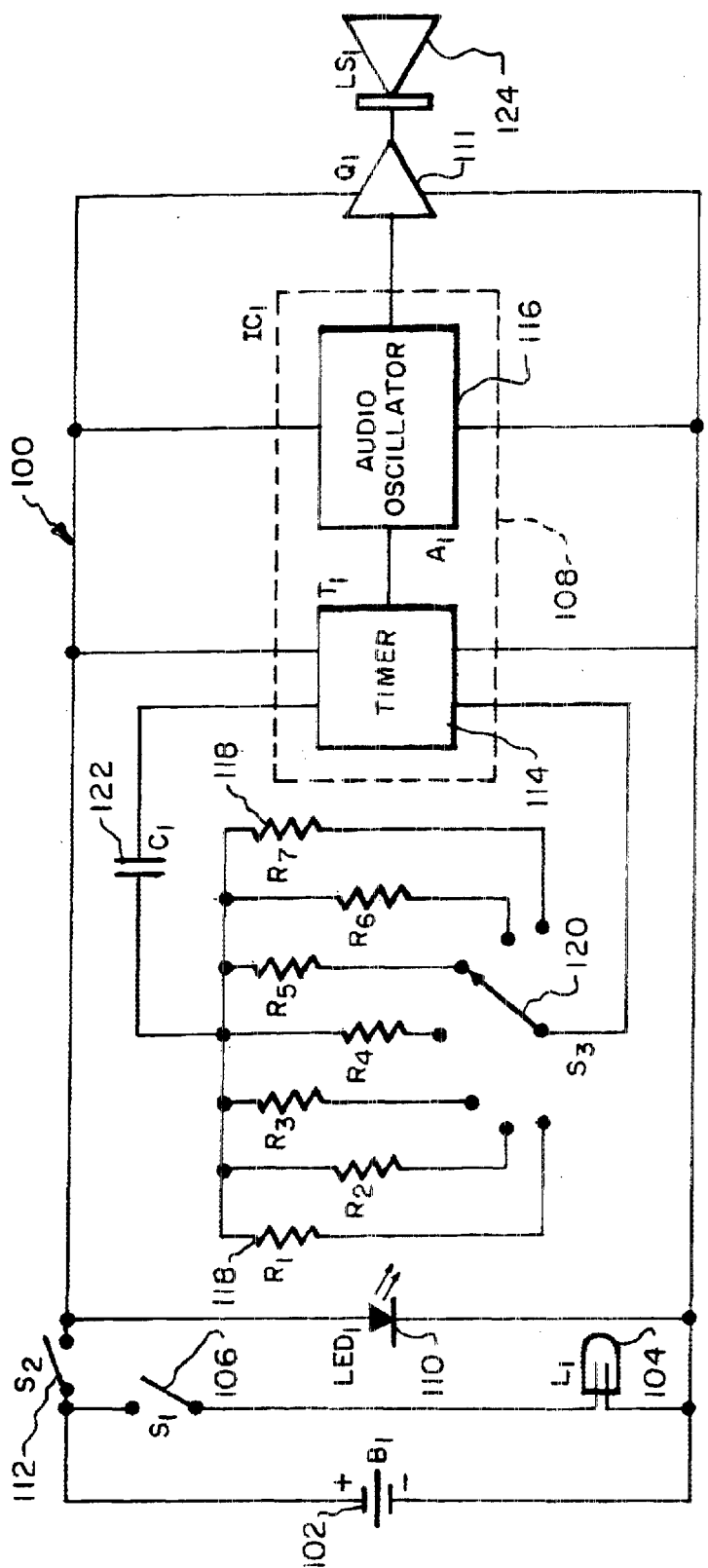
FIG. 8 is a schematic diagram of an electronic circuit of the combination tool.
Figure 9:
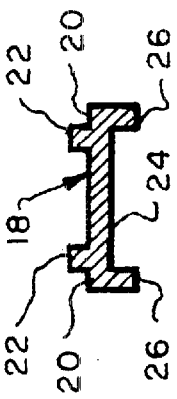
FIG. 9 is a section view of an implement end portion of one of the removably attachable interchangeable implements of the combination tool.

The preferred embodiments of the present invention will be described with reference to FIGS. 1–9 of the drawings. Identical elements in the various figures are identified with the same reference numbers.

FIGS. 1–9 show an embodiment of a combination tool 10, constructed in accordance with the present invention, for facilitating cooking and/or barbecuing. The combination tool 10 has a handle 12, a removably attachable fork implement 14, and a removably attachable spatula implement 16. The removably attachable fork and spatula implements 14 and 16, respectively, are adapted for use interchangeably and individually, one at a time with the handle 12. Other cooking implements such as a spoon or kinfe may removable attached to the handle 12.

The removably attachable fork implement 14, and the removably attachable spatula implement 16 each have an implement end portion 18 having upper bearing surface edges 20, upper tracks 22, lower bearing surface 24, lower tracks 26, detent receiving slot 28, flange 30 having hole 32 therethrough, and tool portion 34. In the instant emboidiment of the combination tool 10, the removably attachable fork implement 14 has fork tool portion 34A, and the removably attachable spatula implement 16 has spatula tool portion 34B, although other suitable removably attachable interchangeable implements having other tool portions may be used. Such ones of the combination tool 10 may be used to facilitate cooking and/or barbecuing and/or other uses and/or purposes.

The handle 12 has upper interior rails 36, lower interior rails 38, and a handle end 40 having a mating opening 42 adapted to matingly receive and guide the implement end portion 18 of the removably attachable fork implement 14, the removable attachable spatula implement 16, or other suitable removably attachable interchangeable implement thereinto the handle 12, matingly therebetween and thereonto the upper interior rails 36 and the lower interior rails 38 of the handle 12. The mating opening 42 of the handle 12 has slot 44, having upper bearing surface receiving edges 46 and upper track receiving notches 48, adapted to matingly receive and guide the upper bearing surface edges 20 of the implement end portion 18 thereonto the upper interior rails 36, the upper tracks 22 of the implement end portion 18 adjacent and therebetween the upper interior rails 36, respectively, and lower bearing surface receiving edge 50 and lower track receiving notches 52, adapted to matingly receive and guide the lower bearing surface 24 of the implement end portion 18 thereonto the lower interior rails 38 therebetween and adjacent the lower tracks 26 of the implement end portion 18, respectively.

The handle 12 has a spring loaded detent 54 having a cantilevered spring 56, a detent stop 58 affixed to the cantilevered spring 56, and a spring loaded release 60. The spring loaded detent 54 releasably locks the removably attachable fork implement 14, the removable attachable spatula implement 16, or other suitable removably attachable interchangeable implement thereinto the handle 12. The detent stop 58 has an arcuate shaped end stop 62 and surface 64 angularly disposed from the cantilevered spring 56. The cantilevered spring 56 is adjoined to lower interior portion 65 of the handle 12 at cantilever spring end 66. The opposing end 68 of the cantilevered spring 56, has a substantially arcuate shaped end 70, and a dimple 74 at top surface 76 proximal to the substantially arcuate shaped end 70. Top portion 78 of the handle 12 has the spring loaded release 60 mounted therein, the top portion 78 having a hole 80 therein and mounting assembly 82 adapted to house the spring loaded release 60. The spring loaded release 60 has release button 84 moveably retained in the hole 80 adjacent the exterior surface 86 at the top portion 78 of the handle 12.

The release button 84 has a release rod 88 adjoined thereto, and a coil spring 90 circumferentially wound about the release rod 88. The coil spring 90 maintains the release button 84 adjacent the exterior surface 86 at the top portion of the handle 12, when the release button 84 is not depressed.

The detent receiving slot 28 of the removably attachable fork implement 14, the removable attachable spatula implement 16, or other suitable removably attachable interchangeable implement has an arcuate shaped edge 92 and sides 94 adapted to receive the detent stop 58 affixed to the cantilevered spring 56, and retain the removably attachable fork implement 14, the removable attachable spatula implement 16, or other suitable removably attachable interchangeable implement in the handle 12.

Upon inserting the removably attachable fork implement 14, the removable attachable spatula implement 16, or other suitable removably attachable interchangeable implement into the mating opening 42 of the handle 12, and pushing the implement end portion 18 into the handle 12, the detent stop 58 is forced down temporarily, =increasingly depressing the cantilevered spring 56 towards bottom interior portion 96 of the handle 12, and the flange 30 approaches the handle end 40. At the end of travel of the implement end portion 18, the flange 30 abuts the handle end 40, the detent stop 58 is forced up by the cantilevered spring 56, locking the arcuate shaped end stop 62 of the detent stop 58 abuttingly against the arcuate shaped edge 92 of the detent receiving slot 28 of the implement end portion 18, locking the removably attachable fork implement 14, the removable attachable spatula implement 16, or other suitable removably attachable implement into the handle 12.

The removably attachable fork implement 14, the removable attachable spatula implement 16, or other suitable removably attachable interchangeable implement may be removed from the handle 12 by depressing the release button 84, which forces the end 98 of the release rod 88 against the dimple 74 of the cantilevered spring 56, forcing the cantilevered spring 56 and the detent stop 58 temporarily towards the bottom interior portion 96 of the handle 12, clearing the arcuate shaped end stop 62 of the detent stop 58 from abutting against the arcuate shaped edge 92 of the detent receiving slot 28 of the implement end portion 18, clearing the detent stop 58 from the detent receiving slot 28 of the implement end portion 18, and withdrawing the removably attachable fork implement 14, the removable attachable spatula implement 16, or other suitable removably attachable interchangeable implement therefrom the handle 12, after which, the release button 84 is released.

The combination tool 10 can have an electronic circuit 100, within the handle 12, having batteries $B_1$ 102, which supply power to lamp $L_1$ 104, when switch $S_1$ 106 is closed, and power to integrated circuit $IC_1$ 108 and light emitting diode $LED_1$ 110, when switch $S_2$ 112 is closed.

The lamp $L_1$ 104 protrudes therefrom the handle end 40 and therethrough the hole 32 of the flange 30, when the flange 30 is abutted against the handle end 40, and the removably attachable fork implement 14, the removable attachable spatula implement 16, or other suitable removably attachable interchangeable implement is locked to the handle 12, allowing light to illuminate the food being cooked and/or barbecued and/or an area or surface in proximity to the combination tool 10, when the switch $S_1$ 106 is closed.

The integrated $IC_1$ 108 has timer $T_1$ 114 and audio oscillator $A_1$ 116, the time constant of the timer $T_1$ 114 being controlled by a particular one of resistors $R_1$–$R_7$ 118, each of which has a different value, a particular one of the resistors $R_1$–$R_7$ 118 being selected by switch $S_3$ 120 to be in series with capacitor $C_1$ 122 and the timer $T_1$ 114. The timer $T_1$ 114 may be set to one of a plurality of time durations, the time duration depending upon the RC time constant of a selected one of the resistors $R_1$–$R_7$ 118, selected therewith the switch $S_3$ 120, and the capacitor $C_1$ 122, preferably prior to closing the switch $S_2$ 112, and applying power to the integrated circuit $IC_1$ 108.

Power is supplied to the integrated circuit $IC_1$ 108, the light emitting diode $LED_1$ 110, and transistor amplifier $Q_1$ 111, when the switch $S_2$ 112 is closed, after selection of an appropriated time duration with the switch $S_3$ 120, which illuminates the light emitting diode $LED_1$ 110, and starts the timer $T_1$ 114. The timer $T_1$ 114 signals the audio oscillator $A_1$ 116 to emit an audio signal thereto the transistor amplifier $Q_1$ 111, which amplifies the audio signal, the amplified audio signal being supplied thereto loud speaker $LS_1$ 124, which emits an audible sound. The loud speaker $LS_1$ 124 emits the audible sound, upon completion of the time duration previously selected therewith the switch $S_3$ 120, and audibly alerts a user at the end of the selected time duration, for example, as to how long food has been cooked or barbecued. Upon being alerted, the user may then optionally turn the timer $T_1$ 114, the audio oscillator $A_1$ 116, the transistor amplifier $Q_1$ 111, and the light emitting diode $LED_1$ 110 off, by opening the switch $S_2$ 112.

The switch $S_1$ 106 and the switch $S_2$ 112 are accessible at the exterior surface 86 of upper portion 125 of the handle 12 to facilitate control of the lamp $L_1$ 104, the timer $T_1$ 114, the audio oscillator $A_1$ 116, and the light emitting diode $LED_1$ 110, the light emitting diode $LED_1$ 110, being viewable at the exterior surface 86 of the top portion of the handle 12. The switch $S_3$ 120 is a rotary switch, and is mounted at rear end 126 of the handle 12, the rear end 126 opposing the handle end 40. Knob 128 is affixed to shaft 130 of the switch $S_3$ 120, and has time duration markings 132, indicating respective ones of time durations, a respective one of the time duration markings 132 being aligned with reference mark 134 adjacent the rear end 126 of the handle 12 to select a desired time duration and associated time constant for the timer $T_1$ 114.

The batteries $B_1$ 102, which are typically two 1.5 volt AA batteries, are mounted within lower interior portion 65 of the handle 12, lower portion 136 of the handle 12 having opening 138 and mating cover 140 to facilitate easy access, installation, and removal of the batteries $B_1$ 102. The integrated circuit $IC_1$ 108 may be a 74HCT4060 or other suitable integrated circuit. The transistor amplifier $Q_1$ 111 may be a S9013, 2N4401, or other suitable general purpose transistor.

The handle 12 may be of thermoplastics, thermosetting polymers, hard rubber, or other suitable material or combination thereof, and may be of molded or other suitable construction, and preferably of heat resistant material. The handle 12 may be of other suitable materials, depending upon the applications that the combination tool 10 will be subjected to.

The upper portion 125 of the handle 12, and the lower portion 136 of the handle 12 are preferably constructed as separate mating units, fastened one to the other with fasteners 142, to facilitate manufacturing, assembly, and installation of components therein the handle 12. The upper portion of the handle 125 has raised exterior ribs 144 to facilitate handling by a user, and the lower portion of the handle 12 has finger grips 146 to facilitate holding the handle 12, and minimize the chances that the combination tool 10 may slip from a user's hand, if the handle 12 becomes greasy or wet. The handle 12 is coated with a non slip rubberized coating, non skid surface coating, or other suitable finish to further enhance grip, and minimize the chance of slippage of the combination tool 10 from the user's hand.

In the instant case of the present invention of the combination tool 10, the removably attachable fork implement 14 has the fork tool portion 34A, and the removably attachable spatula implement 16 has the spatula tool portion 34B, which are preferably of stainless steel, steel, brass, metal, or other suitable material, and preferably of heat resistant and corrosion resistant material, although other suitable removably attachable interchangeable implements having other tool portions and other suitable materials may be used, for use in other applications. The implement end portion 18 may be of thermoplastics, thermosetting polymers, hard rubber, or other suitable material or combination thereof, and may be of molded or other suitable construction, preferably molded about the fork tool portion 34A, the spatula tool portion 34B, or other suitable tool portion, and preferably of heat resistant material.

The handle 12 also has carrying strap and hanger 148 fastened to the handle 12 adjacent the rear end 126 of the handle 12.

Although the present invention has been described in considerable detail with reference to certain preferred versions thereof, other versions are possible. Therefore, the spirit and scope of the appended claims should not be limited to the description of the preferred versions contained herein.

What is claimed is:

1. A combination tool, comprising:
   a handle;
   at least one removably attachable implement adapted for use with said handle, said handle having an implement receiving portion and a spring loaded detent adapted to releasably lock said removably attachable implement into said implement receiving portion of said handle;
   said removably attachable implement having a receiving slot adapted to matingly receive said detent stop, and releasably lock said detent stop abuttingly against an edge of said receiving slot;
   said detent stop is arcuate shaped and said receiving slot edge is matingly arcuate shaped;
   said removably attachable implement has an end portion having upper bearing surface edges, upper tracks, lower bearing surface, lower tracks, and tool portion; and
   said handle has upper interior rails, lower interior rails, an handle end having mating opening adapted to matingly receive and guide said removably attachable implement end portion thereinto said handle, matingly therebetween and thereonto said upper interior rails and said lower interior rails of said handle.

2. The combination tool according to claim 1 wherein said removably attachable implement end portion is matingly releasably locked therebetween said upper interior rails of said handle and said lower interior rails of said handle.

3. The combination tool according to claim 1, wherein said removably attachable implement has a receiving slot adapted to matingly receive said detent stop, and releasably lock said detent stop abuttingly against an edge of said receiving slot.

4. The combination tool according to claim 1, wherein said detent stop is arcuate shaped and said receiving slot edge is matingly arcuate shaped.

5. The combination tool according to claim 1, wherein said spring loaded detent is adapted to lock said removably attachable implement therein said handle at end of travel of said removably attachable implement wherein said handle.

6. The combination tool according to claim 1, wherein said removably attachable implement has a flange adapted to limit travel of said removably attachable implement therein said handle.

7. The combination tool according to claim 1, wherein said spring loaded detent has a spring loaded release adapted to release said removably attachable implement from said handle.

8. The combination tool according to claim 1, wherein said spring loaded detent is spring loaded with a cantilevered spring.

9. The combination tool according to claim 1, wherein said removably attachable implement has a fork tool portion.

10. The combination tool according to claim 1, wherein said removably attachable implement has a spatula tool portion.

11. The combination tool according to claim 1, herein said handle has a lamp adapted to illuminate an area proximal to an end of sad handle.

12. The combination tool according to claim 11, wherein said lamp is adjacent said implement receiving portion of said handle.

13. The combination tool according to claim 1, wherein said handle has a timer having selectable time durations.

14. The combination tool according to claim 13, herein said timer emits a signal to an audio oscillator at end of a selected time duration, and said audio oscillator drives a loudspeaker, which emits audible sound at said and of said selected time duration.

15. The combination tool according to claim 1, wherein said combination tool has a plurality of removably attachable interchangeable implements.

16. A combination tool, comprising:
    a handle;
    at least one removably attachable implement adapted for use with said handle, said removably attachable implement having an end portion having upper bearing surface edges, upper tracks, lower bearing surface, lower tracks, detent receiving slot, flange having hole therethrough, and tool portion;
    said handle having an implement receiving portion, having upper interior rails, lower interior rails, and handle end having mating opening adapted to matingly receive and guide said removably attachable implement end portion into said handle, matingly therebetween and thereonto said upper interior rails and said lower interior rails of said handle;
    said handle having a spring loaded detent adapted to releasably lock said removably attachable implement thereinto said implement 7ceiving portion of said handle matingly therebetween said upper interior rails and said lower interior rails of said handle.

17. The combination tool according to claim 16, wherein said removably attachable implement has a receiving slot adapted to matingly receive said detent stop, and releasably lock said detent stop abuttingly against an edge of said receiving slot.

18. The combination tool according to claim 17, wherein said detent stop is arcuate shaped and said receiving slot edge is matingly arcuate shaped.

19. The combination tool according to claim 16, wherein said spring loaded detent is adapted to lock said removably attachable implement therein said handle at end of travel of said removably attachable implement in said handle.

20. The combination tool according to claim 16, wherein said removably attachable implement has a flange adapted to limit travel of said removably attachable implement therein said handle.

21. The combination tool according to claim 16, wherein said spring loaded detent has a spring loaded release adapted to release said removably attachable implement from said handle.

22. The combination tool according to claim 16, wherein said spring loaded detent is spring loaded with a cantilevered spring.

23. The combination tool according to claim 16, wherein said removably attachable implement has a fork tool portion.

24. The combination tool according to claim 16, wherein said removably attachable implement has a spatula tool portion.

25. The combination tool according to claim 16, wherein said handle has a lamp adapted to illuminate an area proximal to an end of said handle.

26. The combination tool according to claim 25, wherein said lamp is adjacent said implement receiving portion of said handle.

27. The combination tool according to claim 16, wherein said handle has a timer having selectable time durations.

28. The combination tool according to claim 3, wherein said timer emits a signal to an audio oscillator at end of a selected time d ration, and said audio oscillator drives a loudspeaker, which emits audible sound at said end of said selected time duration.

29. The combination tool according to claim 28, wherein said combination tool has a plurality of removably attachable interchangeable implements.

30. A combination tool, comprising:

a handle;

at least one removably attachable implement adapted for use with said handle, said removably attachable implement having an end portion having upper bearing surface edges, upper tracks, lower bearing surface, rower tracks, detent receiving slot, flange having hole therethrough, and tool portion;

said handle having an implement receiving portion, having upper interior rails, lower interior rails, and handle end having mating opening adapted to matingly receive and guide said removably attachable implement end portion thereinto said handle, matingly therebetween and thereonto said upper interior rails and said lower interior rails of said handle;

said handle having a spring loaded detent adapted to releasably lock said removably attachable implement thereinto said implement receiving portion of said handle matingly therebetween said upper interior rails d said lower interior rails of said handle;

said removably attachable implement having a receiving slot adapted to matingly receive said detent stop, and releasably lock said detent stop abuttingly against an edge of said receiving slot;

said spring loaded detent adapted to lock said removably attachable implement therein said handle at end of travel of said removably attachable implement therein said handle;

said spring loaded detent having a spring loaded release adapted to release said removably attachable implement from said handle.

31. The combination tool according to claim 30, wherein said detent stop is arcuate shaped and said receiving slot edge is matingly arcuate shaped.

32. The combination tool according to claim 30, wherein said removably attachable implement has a flange adapted to limit said travel of said removably attachable implement therein said handle.

33. The combination tool according to claim 30, wherein said spring loaded detent is spring loaded with a cantilevered spring.

34. The combination tool according to claim 10, wherein said removably attachable implement has a fork tool portion.

35. The combination tool according to claim 30, wherein said removably attachable implement has a spatula tool portion.

36. The combination tool according to claim 30, wherein said handle has a lamp adapted to illuminate an area proximal to area end of said handle, said lamp being adjacent said implement receiving portion of said handle.

37. The combination tool according to claim 30, wherein said handle has a timer having selectable time durations, wherein further said timer emits a signal to an audio oscillator at end of a selected time duration, and said audio oscillator drives a loudspeaker, which emits audible sound at said end of said selected time duration.

38. The combination tool according to claim 30, wherein said combination tool has a plurality of removably attachable interchangeable implements.

* * * * *